United States Patent [19]

Gonnello

[11] Patent Number: 5,448,850
[45] Date of Patent: Sep. 12, 1995

[54] NON-FREEZE TIP UP

[75] Inventor: Lawrence J. Gonnello, Belchertown, Mass.

[73] Assignee: Michael Toomey, Windham, Conn.

[21] Appl. No.: 315,705

[22] Filed: Sep. 30, 1994

[51] Int. Cl.⁶ ............................................. A01K 85/01
[52] U.S. Cl. ..................................................... 43/17
[58] Field of Search ................................. 43/15, 16, 17

[56] References Cited

U.S. PATENT DOCUMENTS

| | | | |
|---|---|---|---|
| 2,198,286 | 4/1940 | Krivutza | 43/17 |
| 2,506,092 | 5/1950 | Lyons | 43/17 |
| 2,693,046 | 11/1954 | Langevin | 43/17 |
| 2,720,719 | 10/1955 | Stancheck | 43/17 |
| 2,955,374 | 10/1960 | Matzo | 43/16 |
| 2,977,704 | 4/1961 | Tinsley | 43/17 |
| 3,879,880 | 4/1975 | Bailey | 43/17 |
| 5,107,614 | 4/1992 | Gonnello | 43/17 |

*Primary Examiner*—P. Austin Bradley
*Assistant Examiner*—James Miner
*Attorney, Agent, or Firm*—Ross, Ross & Flavin

[57] ABSTRACT

In this apparatus for ice fishing, an upright grease tube is extendable through a hole in the ice. A trio of equispaced legs, pivotally mounted at their upper extremities, is mounted upon a circular sleeve. The legs circumscribe the grease tube and are slidably related relative thereto for spanning the ice hole in the extended position and are slidable lengthwise of the grease tube for spanning the ice surface when the grease tube is withdrawn. Apertured end caps at the opposite ends of the grease tube retain a charge of grease therewithin. An operating rod is extendable through the grease tube and the end caps and outboard thereof at each end of the grease tube. A reel support projects from and is secured relative to the grease tube. A payout reel is rotatively mounted on the reel support for reeling a fish line. A projection extends outwardly from the inboard face of the payout reel and contacts the operating rod as the reel is rotated upon the pull of a fish. The rotation of the operating rod releases a signal means at the upper end of the operating rod.

1 Claim, 1 Drawing Sheet

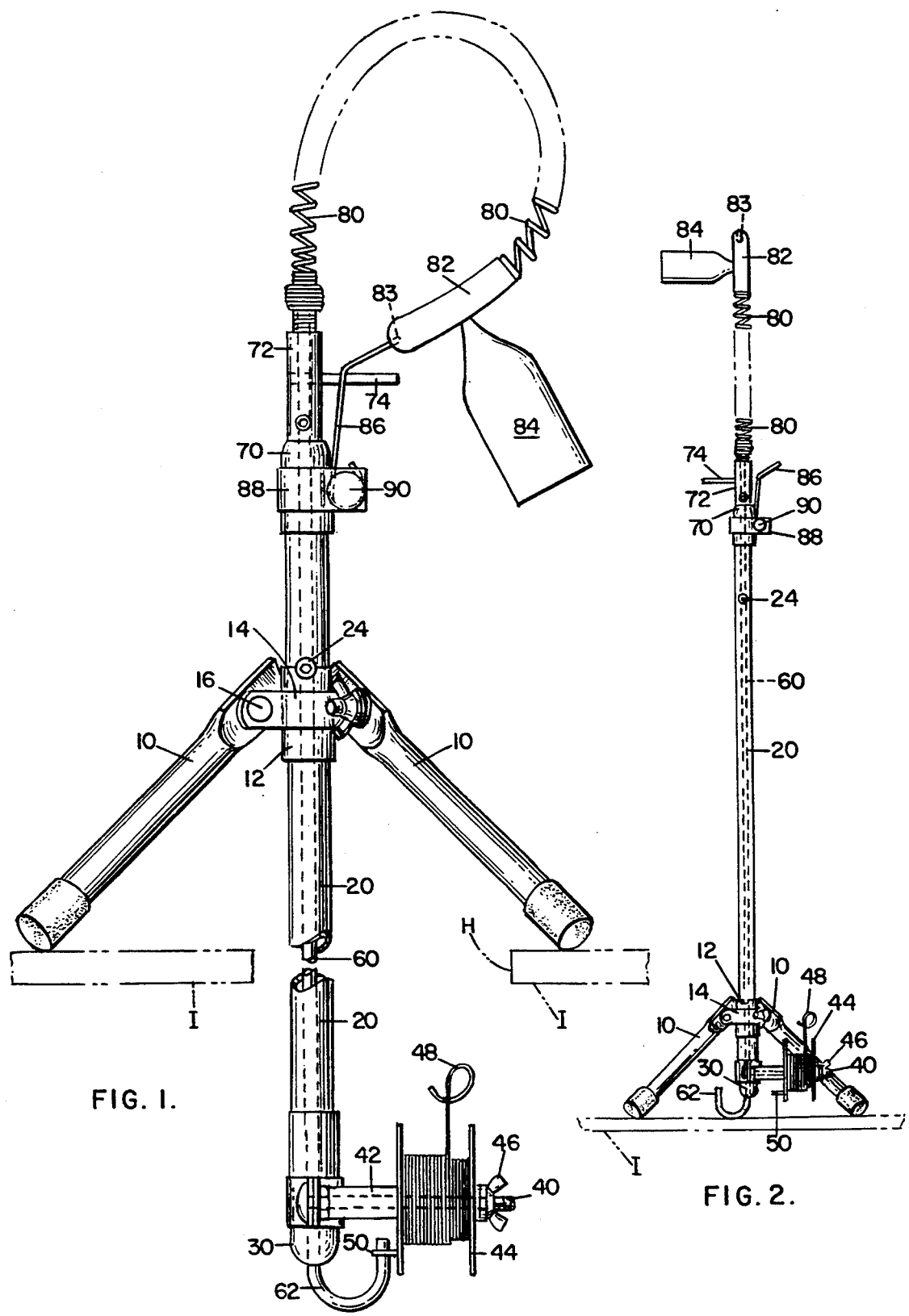

NON-FREEZE TIP UP

BACKGROUND OF THE INVENTION

1. Field of the invention

My invention relates to new and useful improvements relating to signal devices for use in fishing through the ice and specifically to an improved means for signalling that a fish strike has occurred.

The invention provides in combination a reel support pin and a payout reel rotatively mounted thereon for reeling a line to be used as a fishing line and a releasable signal means capable of automatic release from a ready-to-operate position to a signalling position when the hook at the end of the line is taken by the fish so as to indicate the same to the fisherman.

2. Description of the Prior Art

A tip-up is known in the art and normally includes a base which spans the hole in the ice, a reel assembly, a trigger mechanism, and a means for signalling the user upon the incidence of a fish strike.

Representative patents in the art include my own
U.S. Pat. No. 4,121,367 of Oct. 24, 1978
U.S. Pat. No. 4,228,609 of Oct. 21, 1980
U.S. Pat. No. 5,107,614 of Apr. 28, 1992
and other examples of tip-ups include
U.S. Pat. No. 1,803,914 of May 5, 1931
U.S. Pat. No. 2,114,529 of Apr. 19, 1938
U.S. Pat. No. 2,122,841 of Jul. 5, 1938
U.S. Pat. No. 2,502,231 of Mar. 28, 1950

SUMMARY OF THE INVENTION

An ice fishing apparatus and signaling device includes novel modifications to a conventional tip-up which transmits a signal to the fisherman upon the incidence of a fish strike.

The apparatus includes a tripod arrangement which bridges a hole in the ice and supports a tubular member which is vertically disposed in manner to allow a lower portion thereof to depend through the hole and into the water therebelow.

The tubular member supports in fixed relationship a transversely extending reel support pin which mounts a rotatable reel from which a fishing line with hook is payable out.

A single rod-like member extends from, and is rotated by movement of the reel as a fish pulls on the line thereof, to the top of the apparatus where it causes a pin to rotate horizontally upon its own rotation, which pin rotation causes the release of a resilient band which is bent upon itself into a locking position when in the ready-to-operate mode, and upon release causing it to unbend into an upright signalling position when in the operative mode.

DESCRIPTION OF THE DRAWINGS

FIG. 1 is a view, in front elevation of the device showing the signal means latched in the ready-to-operate position;

FIG. 2 is a small scale view, in front elevation showing the signal means in unlatched position and the device withdrawn from its working position relative to the ice and to a position where the entire structure is in a standing position on top of the ice surface.

DESCRIPTION OF THE PREFERRED EMBODIMENT

A trio of equispaced tripod legs 10, are arranged at 120° angles from each other, and are angularized as to each other so as to converge at their upper extremities for pivotally mounting on a circular sleeve 12.

Complemental spacers 14 are provided between each pair of adjacent legs and are held relative thereto as by pins 16 wherefor the legs may swing freely between outwardly-extended bridging position, as shown in FIG. 1, and collapsed positions of adjacency around a vertically extending grease tube 20.

Sleeve 12 loosely circumscribes grease tube 20 so that it is slidable relative thereto between an upper position, as shown in FIG. 1, where further upward movement along the grease tube is precluded by the engagement of a notch in sleeve 12 with a projecting stop pin 24 stationarily fitted to grease tube 20.

The FIG. 1 showing is of the device in the bridging operating position, with the lower portion of the support extending through the hole H into the water below the surface of the ice I, with the lower extremities of the legs seating upon the upper ice surface.

When not in operational use, the device may be withdrawn upwardly from the water through the ice hole, and, if desired, placed in a standing position on the ice, as shown in FIG. 2. With sleeve 12 and legs 10 having lowered themselves relative to the grease tube to the point where the legs seat upon the ice to maintain the device in upright position.

A seal 30 circumscribes and encloses the lower end of the grease tube so as to insure against any leakage of the grease or other packing material from within the grease tube. The grease serves to keep the components from freezing together.

In horizontally-extending position and projecting outwardly from the lower extremity of the grease tube is a reel pin 40 with a spacer 42 slidably receivable upon the reel pin.

The outboard end of reel pin 40 freely mounts a payout reel 44 and allows rotation of the payout reel on the reel pin.

The spacer 42 serves to position the payout reel a desired distance from the grease tube.

An outboard nut 46 is threadedly engaged with the threaded outboard end of the reel pin and may be tightened or loosened, as circumstances dictate, to provide a controlled degree of movement of the payout reel on the reel pin.

The payout reel is provided with an appropriate line 48 and usual hook means, not shown, for attracting a fish as the line is paid out, all as is known.

The reel pin will be seen to be in stationary position relative to the grease tube, but the payout reel will be understood to be freely rotatable on the reel pin as the line is snared.

A projection 50 is provided on the outer face of the inboard side of the payout reel.

Extending centrally through the grease tube is an operating rod 60 the lower extremity of which extends through a central opening in end cap 30. The lower end of the operating rod is turned outwardly at 62 to define a J-configuration When the payout reel is rotated by the pulling of the fish at the end of the line, projection 50 rotating with the payout reel is rotated into contact with the J portion 62 of the operating rod and thus to effect rotation of the operating rod.

The upper extremity of the operating rod extends through an opening in end cap 70 enclosing the upper end of the grease tube and outboard thereof. The upper terminus of the operating rod mounts a chuck 72 from which projects a horizontally disposed release pin 74, which release pin rotates in a horizontal path in accordance with the rotation of the operating rod.

The chuck mounts at its upper face one end of a resilient member shown as a flexible spring 80, which spring carries a spring enclosing cap 82 at its opposite free extremity. The cap has fixed thereto a signal flag 84.

A yieldable hook 86 is secured to and extends upwardly from a coupling 88 which circumscribes the cap 70 and is held stationarily relative thereto as by a screw and nut arrangement 90.

As a fish pulls on the line causing the payout thereof, the line reaches the point where the reel is caused to rotate. Its rotation brings the projection into confronting relation with the J portion of the drive shaft.

The rotation of the operating rod brings about the turning of the release pin.

Cap 82 is provided with an opening 83 on its outboard extremity, into which opening the free end of hook 86 is loosely inserted as spring 80 is brought downwardly and rearwardly upon itself into the FIG. 1 position. Entry of hook 86 into cap 82 via opening 83 serves to hold the spring in the desired "set" position until the release.

A releasable signal means includes chuck 72 mounted on the upper terminus of operating rod 60 and with the horizontally-disposed release pin 74 projecting radially outwardly from the chuck. Coil spring 80 is fixed at its inboard end to the upper end of operating rod 60 and is adapted for flexing into an inverted position. Cap 82 is apertured to enclose the outboard end of the coil spring. The resilient hook 86 extends upwardly adjacent to the chuck and offers an upper free extremity extendable into the cap aperture for holding the cap and spring in the inverted position until rotation of operating rod 60 effects rotation of release pin 74 therewith into a position to effect the disengagement of the resilient hook from the cap so that the coil spring pops upwardly into its vertical signalling position.

I claim:
1. An apparatus for ice fishing comprising:
    an upright grease tube extendable through a hole in the ice and into the water below,
    a bridging arrangement of a trio of equispaced legs pivotally mounted at their upper extremities upon a circular sleeve,
    the bridging arrangement slidably circumscribing the grease tube between an upper operative position for spanning the ice hole with the grease tube extended downwardly through the ice hole and into the water and a lower nonoperative position for seating upon the ice surface with the grease tube extended vertically upwardly in a standing position,
    apertured upper and lower end caps at the opposite ends of the grease tube for retaining a charge of grease therewithin,
    an operating rod extendable through the grease tube and the end caps and outboard thereof at each end of the grease tube,
    a transversely extending reel support projecting from and secured relative to the grease tube,
    a payout reel rotatively mounted on the reel support for reeling a fish line,
    a spacer sleeved upon the reel support for maintaining the payout reel in position distantly of the grease tube,
    securing means for holding the payout reel in position upon the reel support,
    a projection extending outwardly from the inboard face of the payout reel,
    the lower extremity of the operating rod being upturned in a J configuration for contact with the projection of the payout reel as the reel is rotated upon the line being snared by the pull of a fish,
    the upper extremity of the operating rod mounting a releasable signal means capable of automatic release from a ready to operate position to a signalling position,
    the releasable signal means including a chuck mounted on the upper terminus of the operating rod and a horizontally-disposed release pin projecting radially outwardly from the chuck and a coil sprig fixed at its inboard end to the upper end of the operating rod and adapted for flexing into an inverted position and an apertured cap enclosing the outboard end of the coil spring and a resilient hook extending upwardly from the upper end cap and having an upper free extremity extendable into the aperture of the cap for holding the cap and spring in the inverted position until rotation of the operating rod effects rotation of the release pin therewith into a position of disengaging the resilient hook from the apertured cap so that the coil spring pops UP into its vertical signalling position.

* * * * *